United States Patent [19]

Gilmour et al.

[11] Patent Number: 4,970,700

[45] Date of Patent: Nov. 13, 1990

[54] SONAR APPARATUS

[75] Inventors: George A. Gilmour; John D. Marks, both of Severna Park, Md.

[73] Assignee: Westinghouse Electric Corp., Pittsburgh, Pa.

[21] Appl. No.: 438,840

[22] Filed: Nov. 20, 1989

[51] Int. Cl.$^5$ .............................................. G01S 15/00
[52] U.S. Cl. ..................................................... 367/88
[58] Field of Search ................................. 367/88, 104

[56] References Cited

U.S. PATENT DOCUMENTS

| | | | |
|---|---|---|---|
| 3,895,339 | 7/1975 | Jones et al. | 367/88 |
| 3,895,340 | 7/1975 | Gilmour | 367/88 |
| 3,898,608 | 8/1975 | Jones et al. | 367/88 |

*Primary Examiner*—Thomas H. Tarcza
*Assistant Examiner*—Daniel T. Pihulic
*Attorney, Agent, or Firm*—D. Schron

[57] ABSTRACT

Side looking sonar apparatus on a carrier vehicle obtains an acoustic picture of a target area below the vehicle from some minimum range out to some maximum range on either side of the vehicle. An angle look sonar obtains an acoustic picture within the gap portion between the minimum range points of the side looking sonar. Signals are obtained indicative of the heading of the vehicle as well as its actual direction of motion. These signals are utilized to generate a crab angle signal which is utilized to rotate the angle look sonar apparatus to the proper orientation for obtaining complete bottom coverage even when the carrier vehicle is crabbing due to a cross current.

8 Claims, 9 Drawing Sheets

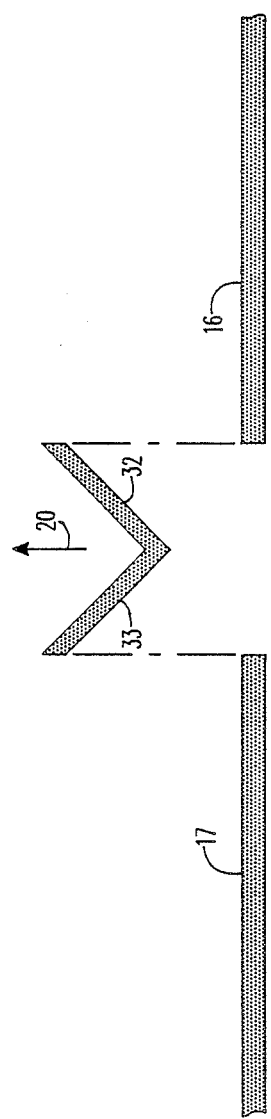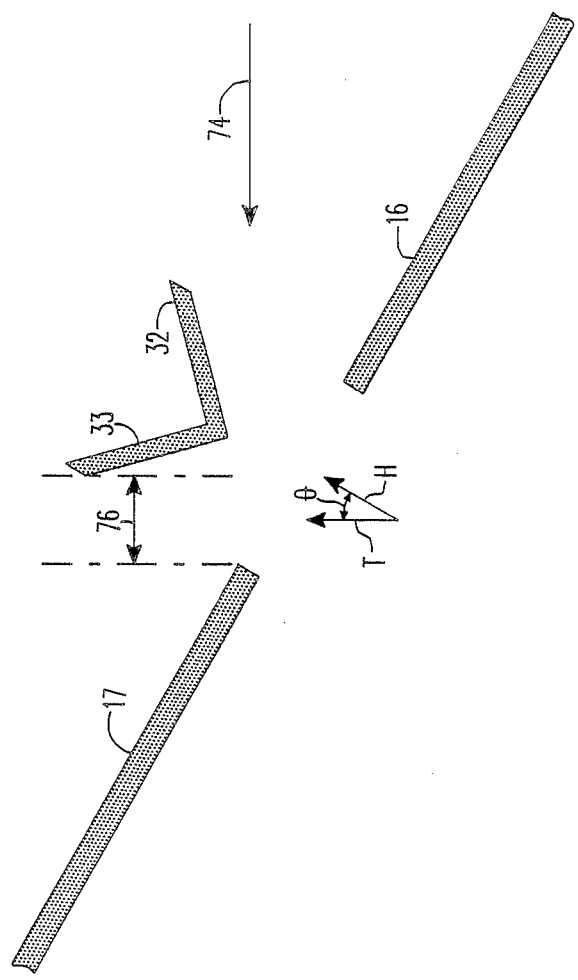

SONAR APPARATUS

BACKGROUND OF THE INVENTION

1. Field of the Invention

The invention in general relates to side looking sonar equipment, and more particularly, to an arrangement for eliminating gaps in the coverage of a target area.

2. Background Information

In side looking sonar systems, the sonar apparatus is mounted on a carrier vehicle which travels along a course line, or track, at a certain altitude above a target area to be examined. A transmitting transducer propagates acoustic energy to either side of the vehicle and the acoustic energy impinges upon the target area in a relatively narrow strip, such impingement process being known as insonification. A receiver transducer in conjunction with signal processing apparatus forms a relatively narrow receiver beam which receives the acoustic energy reflected from the insonified strip. During the course of travel of the carrier vehicle, multiple transmissions take place and the return signals are processed and portrayed on a line-by-line basis that is a pattern of highlights and shadows analogous to an optically viewed panorama illuminated by side lighting, with objects outlined in such a way as to permit their identification.

Side looking sonar systems, have a coverage gap directly beneath the carrier vehicle and to fill in the gap an angle look sonar system has been proposed, using side looking sonar principles, to project and receive acoustic returns from an area ahead of the vehicle in the gap region. Accordingly, with a combination of the side looking and angle look sonar systems, complete coverage of the target area may be obtained. If however, the carrier vehicle is subject to a cross current during the course of travel, it assumes a certain crab angle resulting in less than complete coverage. The apparatus of the present invention is operable with a system such as described and provides and arrangement whereby complete coverage may be obtained even in the presence of crab angle motion.

SUMMARY OF THE INVENTION

Sonar apparatus in accordance with the present invention includes a side looking sonar means which is placed on a carrier vehicle and which is operable to periodically project acoustic energy toward a target area over which the vehicle is traveling. The side looking sonar means forms at least one receiver beam on each side of the vehicle, each for examining reflected acoustic energy from an elongated narrow strip on the target area from some minimum range out to some maximum range thereby leaving an unexamined gap between the minimum range points. The apparatus includes angle look sonar means for placement on the carrier vehicle and operable to periodically project acoustic energy ahead of the vehicle into the gap. The angle look sonar includes at least one transducer means and is operable to form at least one receiver beam to examine reflected acoustic energy from the gap. Means are provided for generating a crab angle signal indicative of the difference between the heading of the carrier vehicle and the actual track of the vehicle with this difference resulting in an unexamined portion of the gap. Control means responsive to the crab angle signal is operable to rotate the transducer means to a position so that the entire gap including the unexamined portion is covered by the angle look sonar receiver beam or beams.

BRIEF DESCRIPTION OF THE DRAWINGS

FIG. 5 is a plan view of receiver beam intersection with the target area;

FIG. 6 illustrates the effect of a crab angle on the coverage obtained;

DESCRIPTION OF THE PREFERRED EMBODIMENT

Figure 1:
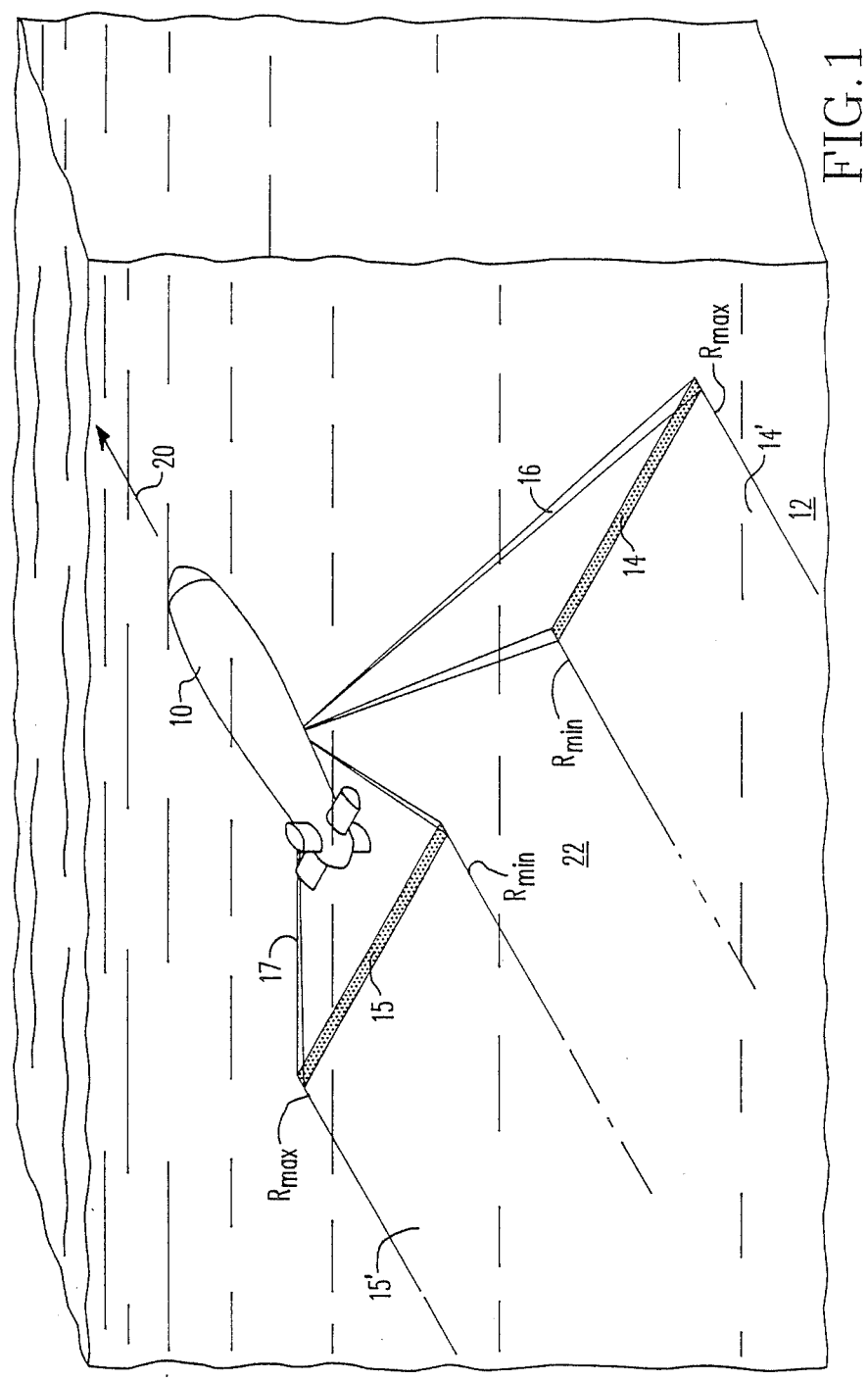
FIG. 1 illustrates a side looking sonar system in operation over a target area.

In FIG. 1 side looking sonar transducers mounted on a carrier vehicle 10 transmit acoustic energy pulses in a certain pattern such that the sound energy impinges upon the target area such as the sea bottom 12 and scans, or sweeps out elongated narrow insonified strips 14 and 15 produced by starboard and port transducers respectively. Reflected acoustic energy containing information relative to the bottom, or targets on the bottom, is picked up by respective starboard and port receiving transducers which in conjunction with signal processing apparatus form respective receiver beams 16 and 17 which examine the insonified areas from some minimum range, $R_{min}$ to some maximum range $R_{max}$.

As vehicle 10 proceeds along a course line, or track, as represented by arrow 20, multiple sequential acoustic transmissions take place such that adjacent areas on the bottom are insonified. Areas 14 and 15 represent the current areas being examined while areas 14' and 15' represent the accumulation of previously examined areas. Each strip examined by a receiver beam produces a corresponding receiver signal which is processed, with the information contained therein being indicative of a sound picture of a target area over which the apparatus travels such that the signals may be recorded for subsequent examination or for real time display. For an increased coverage rate some systems insonify a wider region on each transmission and multiple receiver beams are formed. The present invention is described, by way of example, with a single beam per side system.

Figure 2:
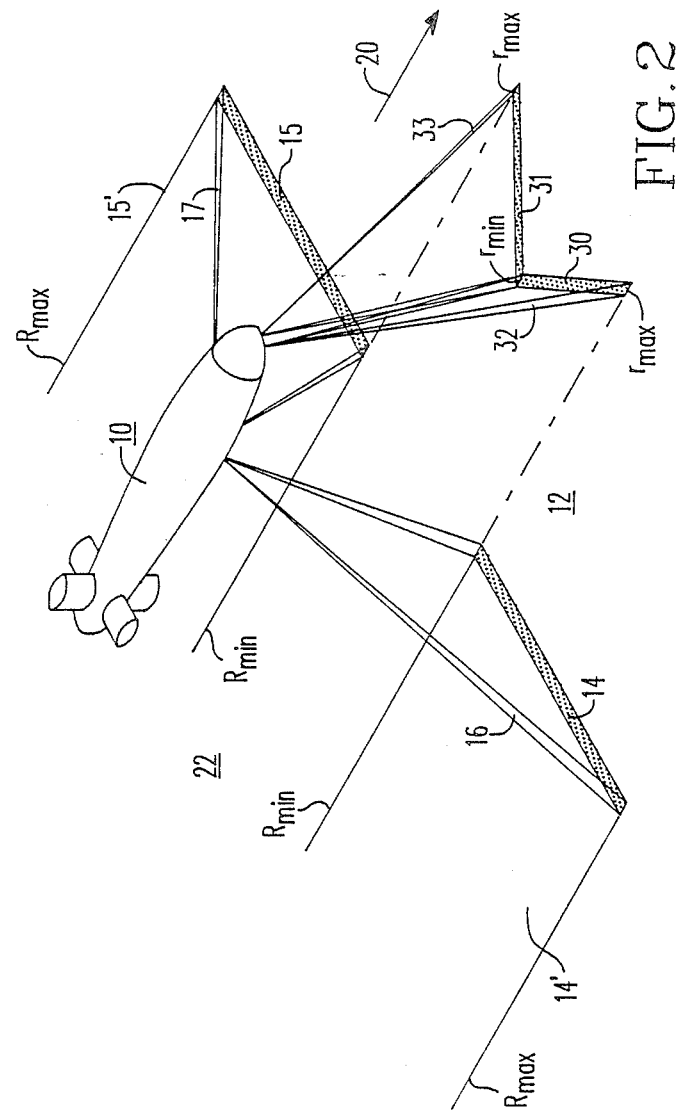
FIG. 2 is another view of FIG. 1 with the addition of an angle look sonar system in operation over the target area.

Side looking sonars have a coverage gap beneath the carrier vehicle as illustrated by the unexamined gap 22 between the minimum range points. Signals from this gap arrive at the side looking sonar transducers at nearly the same time and therefore the bottom range resolution is extremely poor. In addition, in side looking sonar systems, shadows are more important for target interpretation than highlights and a target within the gap 22 would produce little or no shadow. Accordingly, to provide full coverage, including the gap 22 there has been proposed use of an angle look sonar system as illustrated in FIG. 2.

In one type of angle look sonar system, transmitting transducers project acoustic energy into the gap 22 ahead of the vehicle 10 much like the side looking sonar case to sweep out starboard and port insonified narrow strips 30 and 31 which are examined by respective starboard and port receiver beams 32 and 33 from some minimum range $r_{min}$ to some maximum range $r_{max}$ at the ends of the gap. Return signals are processed and combined with the side looking sonar return signals to provide a full coverage display.

Figure 3:
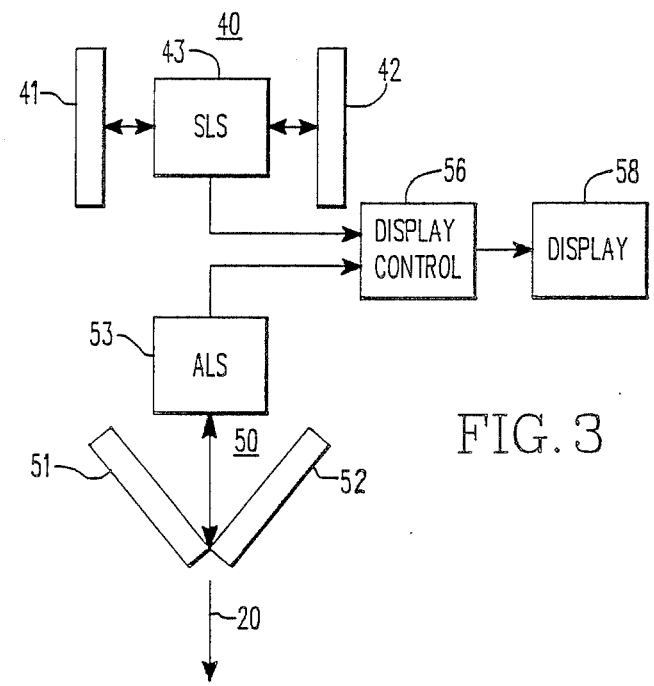
FIG. 3 is a block diagram of the two sonar systems of FIG. 2 in operation.

FIG. 3 is a simplified block diagram of the apparatus necessary for providing a full coverage system. Side looking sonar apparatus 40 includes starboard and port transducer means 41 and 42 as well as the necessary signal processing circuitry 43 collectively operable to periodically project acoustic energy toward the target area over which the carrying vehicle travels. At least one receiver beam per side is formed to derive receiver signals for display purposes.

The vehicle also carries angle look sonar apparatus 50 including starboard and port transducer means 51 and 52 which in conjunction with signal processing circuitry 53 is operable to periodically project acoustic energy into the unexamined gap area and to form at least one receiver beam, or as illustrated at least two, for deriving return signals for display purposes. The receiver signals are processed and are stored in the display control 56 and collectively presented to display device 58 such as a cathode ray tube. Alternatively, the receiver signals may be stored for subsequent viewing after a mission.

Figure 4:
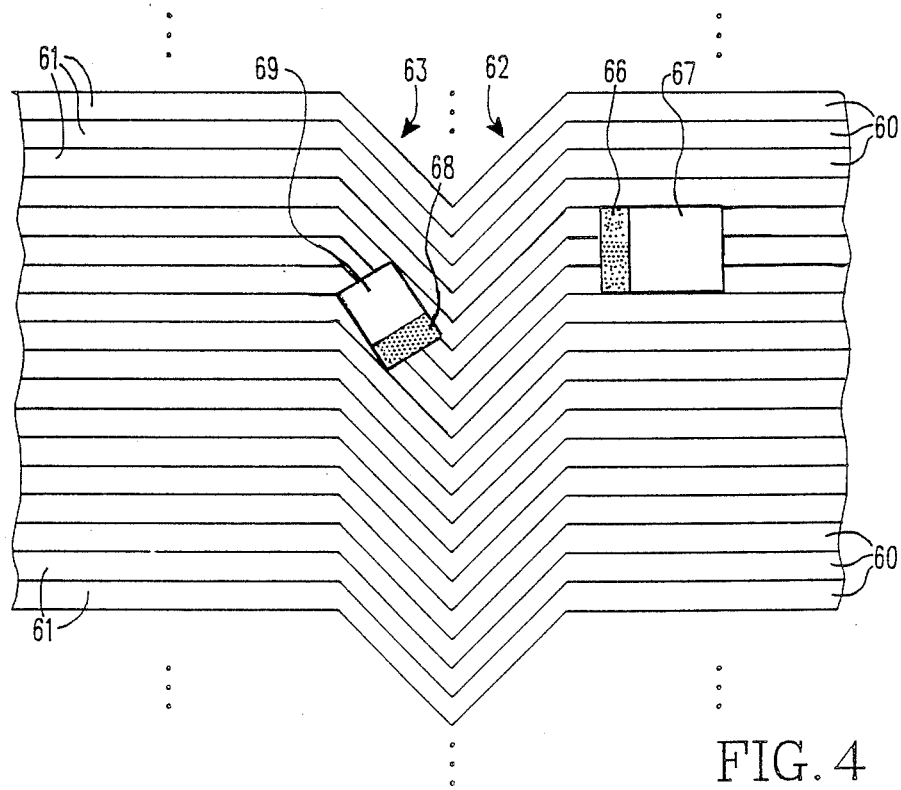
FIG. 4 portrays a typical display of the sonar systems.

A portion o f a typical display is illustrated in FIG. 4 wherein each of the numerals 60 represents a scan line of the display produced as a examination, of an insonified area by a starboard receiver beam of the side-looking sonar system. In a similar manner, numerals 61 represent portrayed signals provided by the port receiver beams. To complete the display, numeral 62 and 63 represent the display signals resulting from the starboard and port beams of the angle look sonar system. Targets or projections on the bottom reflect energy more effectively thereby intensifying the return signal whereas the bottom areas behind these objects lie in an acoustic shadow and thus cause interruptions in the return signal, with the length of the interruption being a function of the size of the shadow cast by the target. In FIG. 4, darkened area 66 represents a highlighted target detected by the starboard portion of the side look sonar with the target having an acoustic shadow 67 directly behind it. The darkened area 68 represents a target detected by the port beams of the angle look sonar and in view of the fact that acoustic energy is being projected ahead of the carrying vehicle, the acoustic shadow 69 of the target is oriented as illustrated.

FIG. 5 is a plan view of the receiver beams as they would intersect a target area. As long as the carrier vehicle moves in the direction of arrow 20 representing the track of the vehicle multiple sequential acoustic transmissions will result in a full coverage display. If however, there is a cross current, there will be a resulting unexamined portion within the gap area resulting in less than full coverage. The situation is depicted in FIG. 6 to which reference is now made.

In FIG. 6 the carrier vehicle is subject to a cross current represented by the arrow 74. In such circumstance, the vehicle itself assumes a certain heading represented by the arrow H which is not in line with the direction in which the vehicle is actually moving, as represented by the track arrow T. The heading and the actual track of the vehicle differ by some angle $\theta$ which is a function of the magnitude of the cross current. The receiver beams 16, 17 and 32, 33 are traveling in the same direction as the track arrow T, which results in an unexamined portion of the gap, this portion being designated by the numeral 76 and as long as the heading and track are different, less than full coverage is obtained and any targets within this gap portion will not be displayed.

Figure 7:
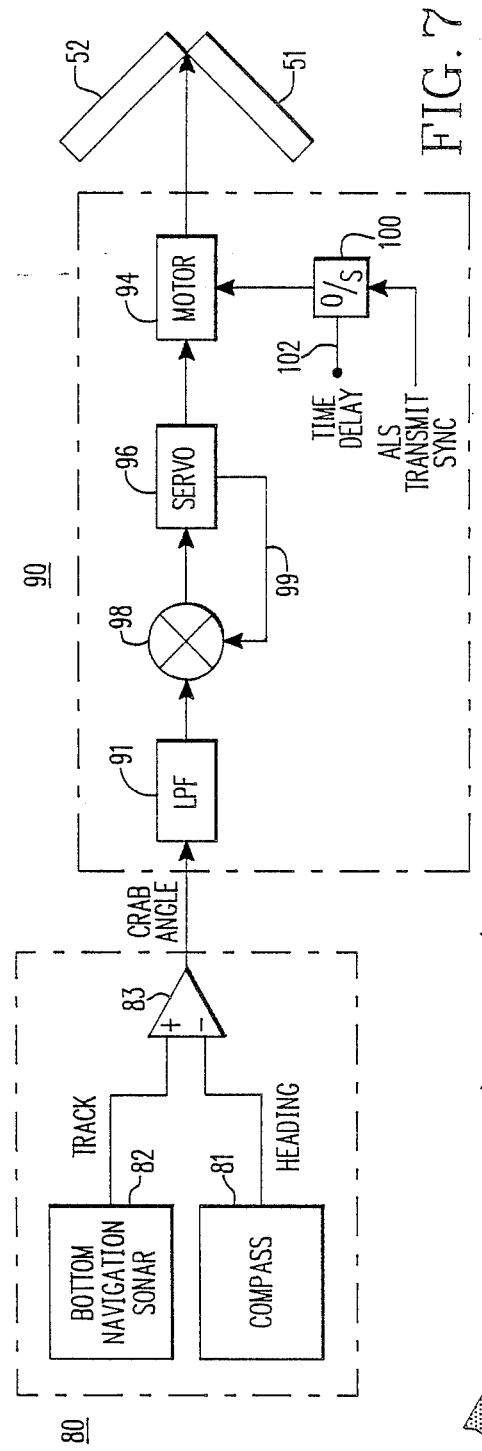
FIG. 7 is a block diagram of one embodiment of the present invention.

FIG. 7 illustrates one embodiment of the invention for correcting the problem. In FIG. 7, means 80 is operable to generate a crab angle signal indicative of the difference between the heading of the vehicle and the actual track of the vehicle and which difference, as illustrated in FIG. 6, results in an unexamined gap portion. The means for generating this crab angle signal includes a compass means 81 operable to provide a compass signal indicative of the heading of the vehicle (arrow H of FIG. 6). Navigation means 82, such as a bottom navigation sonar arrangement provides a navigation signal indicative of the actual line of travel of the vehicle (track arrow T of FIG. 6). The track and heading signals are provided to a differential amplifier 83 which provides an output signal indicative of the difference of the two signals, and which difference is the crab angle signal. The crab angle signal is provided to control means 90 which is operable to rotate the transducer means 51, 52 to a position so that the entire gap including the unexamined portion 72 is covered by the angle look sonar receiver beams.

The control means 90 includes a low pass filter 91 to smooth out any sudden abrupt changes in the crab angle signal so as to prevent any sudden turns of the transducer means 51, 52. A motor 94 is provided for rotating the transducer means 51, 52 and is supplied with a drive signal by means of a servomechanism circuit 96. The crab angle signal is utilized to command a certain rotation of the motor. Once the particular rotation has been achieved, the motor will stop until such time as the command signal, (the crab angle signal) changes. A signal indicative of motor position may be obtained from the servomechanism circuit 96 and provided to subtractor circuit 98 via a feedback line 99.

Figure 8:
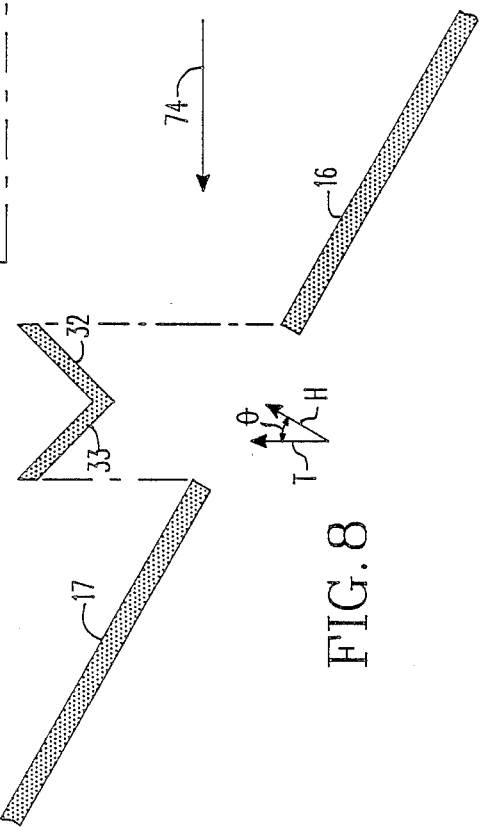
FIG. 8 illustrates the correction obtained with the operation of the embodiment illustrated in FIG. 7.

With respect to the example presented in FIG. 6, operation of the circuitry of FIG. 7 results in a movement of the transducer means 51, 52 such that the angle look receiver beams are rotated to fill in the gap portion as illustrated in FIG. 8. During the course of travel over the target area, multiple acoustic transmissions take place. If a crab angle signal is generated causing movement of transducer means 51, 52, it may be desirable to halt movement of the transducers during an expected acoustic return, so as not to distort the display. Accordingly, means are provided for disabling the motor 94 during an expected acoustic return after an acoustic transmission. To accomplish this function, there is provided a one-shot multivibrator 100 which is triggered by a transmit sync pulse from the angle look sonar system. A blocking pulse provided to the motor 94 by the one-shot multivibrator 100 is controlled by a time delay input on line 102, such input being a function of the vehicle's altitude and may be derived, for example, from an altitude sensor which may be carried by the vehicle or simply may be adjusted by an operator.

Figure 9:
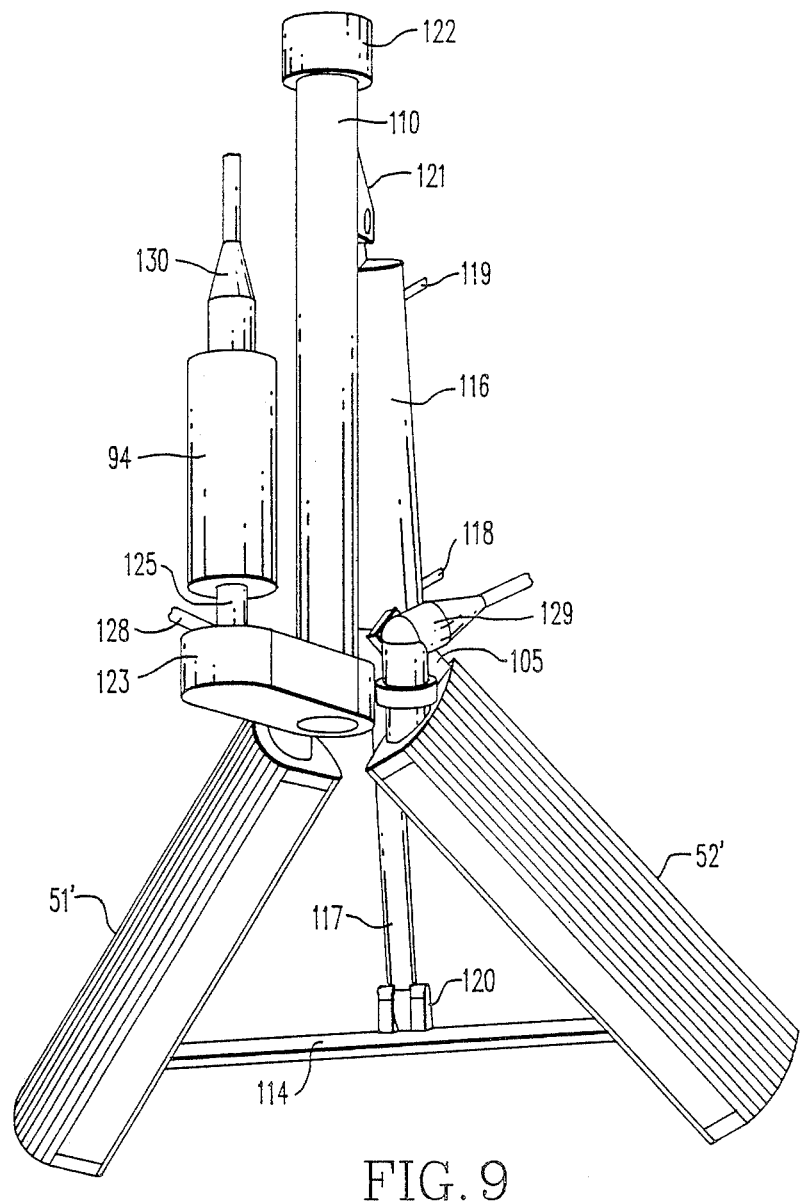
FIGS. 9 and 10 are respective frontal and dorsal views of the angle look sonar transducers during operation.
Figure 10:
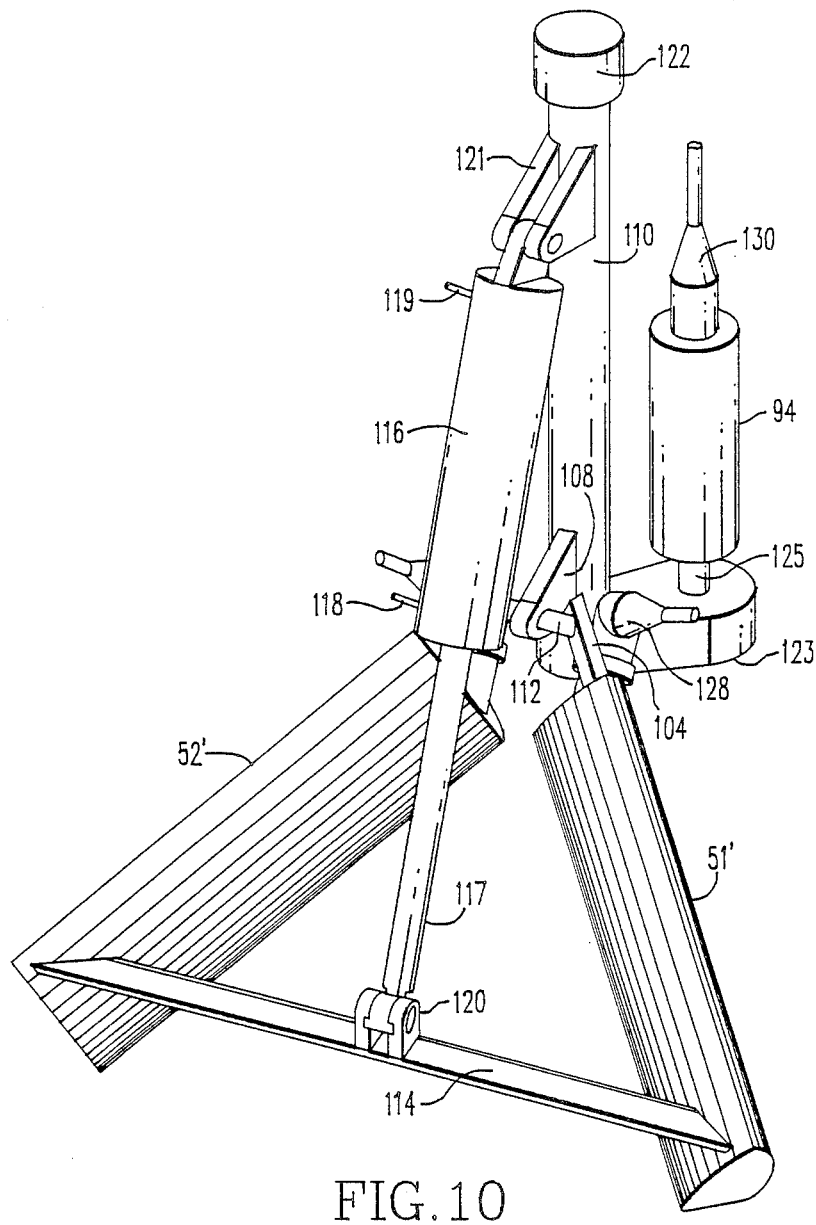

Apparatus for rotating the transducer means 51, 52 of the angle look sonar system is illustrated in the frontal perspective view of FIG. 9 and the dorsal perspective view of FIG. 10. The first and second transducer means are enclosed in respective housings 51' and 52' having respective extension pieces 104 and 105 at one end thereof for pivotal engagement with a bracket 108 connected to a rotatable shaft 110. A pivot pin 112 passes through apertures in extension pieces 104 and 105 as well as bracket 108. The housings 51' and 52' are maintained in their angular orientation by means of a cross brace 114 secured to the respective other ends of the transducer housings.

A retractable plunger mechanism 116 includes a plunger rod 117 which may be activated electrically or by means of hydraulic lines 118 and 119. The plunger rod 117 connects with cross brace 114 at clevis 120, with the other end of the plunger mechanism 116 being rotatably connected to clevis 121 at the upper portion of rotatable shaft 110.

The rotatable shaft 110 has its upper end connected in bearing 122 and its lower end connected to a base 123 which includes a gearing mechanism for rotating the shaft when motor 94 is energized, such connection to the gearing mechanism being accomplished by means of the motor shaft 125.

Electrical connections are made to the first and second transducer means within housings 51' and 52' as well as to the motor 94, and suitable electrical connectors are provided for this purpose. Electrical connector 128 is provided for the transducer means and any associated electronic circuitry carried within housing 51', electrical connector 129 provides a similar function for the components carried within housing 52' and electrical connector 130 provides the energizing signal for motor 94. The apparatus illustrated in FIGS. 9 and 10 may be housed within the carrier vehicle 10 as illustrated in FIGS. 11 and 12, with FIG. 11 illustrating the apparatus in a deployed configuration and FIG. 12 illustrating the apparatus in a retracted or stowed configuration.

Figure 11:
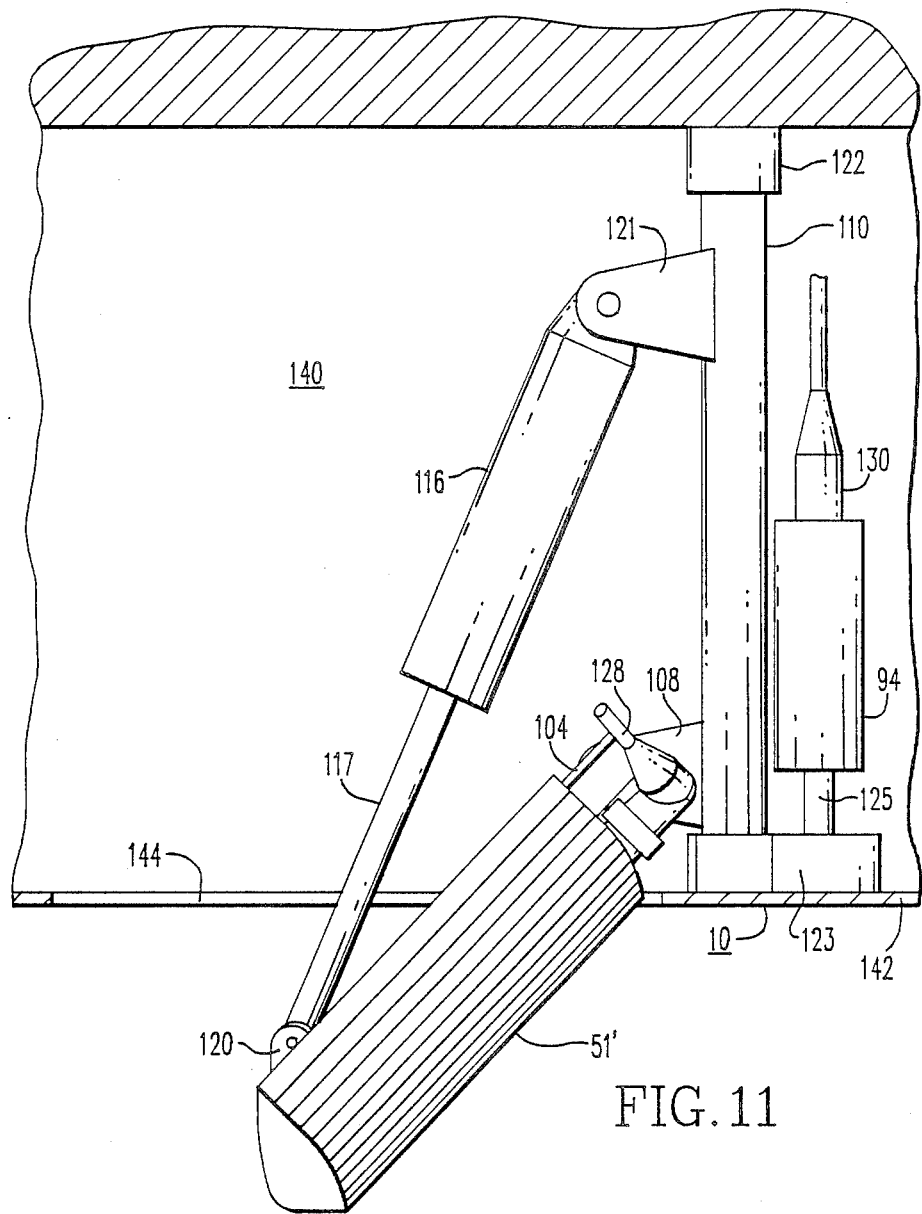
FIGS. 11 and 12 respectively illustrate the angle look sonar transducers in the deployed and retracted positions.
Figure 12:
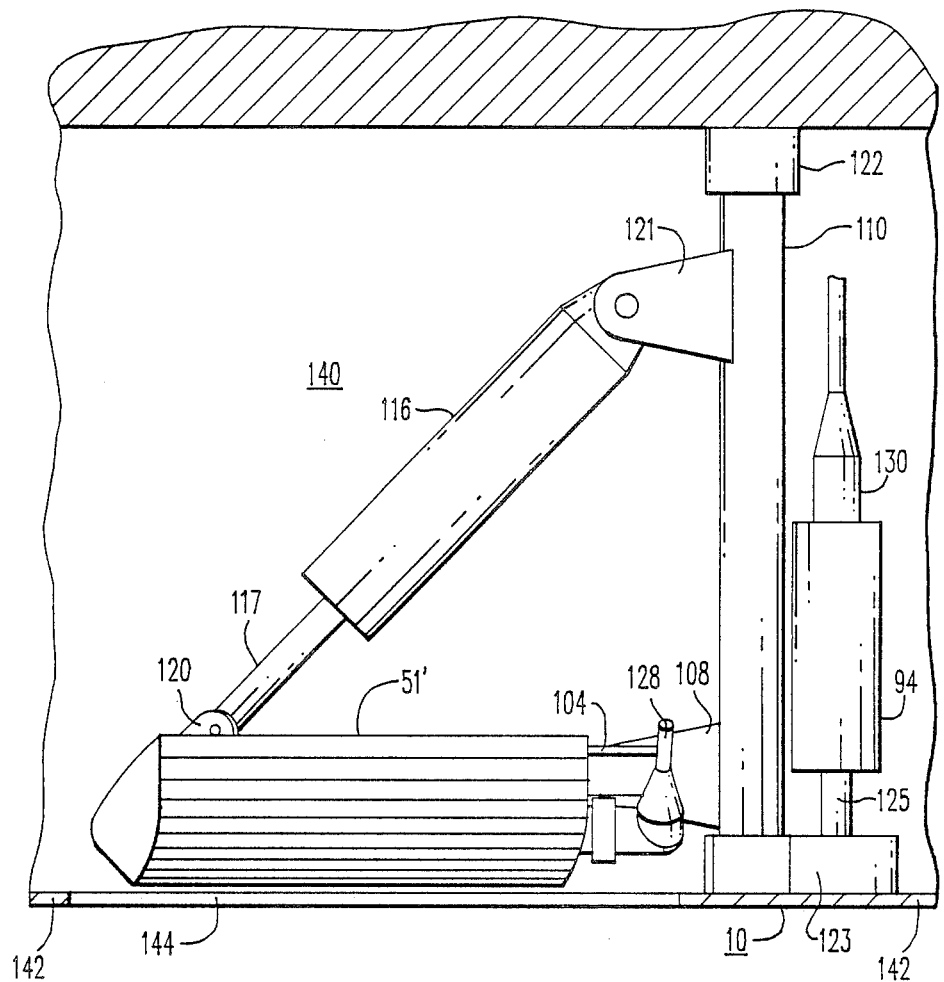

As illustrated in FIGS. 11 and 12, the angle look sonar apparatus is placed within an interior compartment 140 of the carrier vehicle 10 with base 123 being in contact With a floor 142 of the compartment and bearing 122 being secured at its upper end. The transducer housings, as illustrated in FIG. 11, extend through an opening 144 in the floor 142. When not in use, the transducer housings may be retracted by activation of the plunger mechanism 116 whereby the housings are brought into the interior compartment 140, as illustrated in FIG. 12. If desired, a cover may be provided for opening 144 when the apparatus is stowed, and removed when the apparatus is to be put into use by reactivation of the plunger mechanism 116 to deploy the transducer housings into the orientation illustrated in FIG. 11.

What is claimed is:

1. Sonar apparatus comprising:
   (a) side looking sonar means for placement on a carrier vehicle and operable to periodically project acoustic energy toward a target area over which said vehicle travels;
   (b) said side looking sonar means being operable to form at least one receiver beam on each side of said vehicle each for examining reflected acoustic energy from an elongated narrow strip on said target area from some minimum range out to a maximum range, leaving an unexamined gap between said minimum range points;
   (c) angle look sonar means for placement on said carrier vehicle and operable to periodically project acoustic energy into said gap ahead of said vehicle;
   (d) said angle look sonar including at least first transducer means and being operable to form at least one receiver beam to examine reflected acoustic energy from said gap;
   (e) means for generating a crab angle signal indicative of the difference between the heading of said vehicle and the actual track of said vehicle, said difference resulting in an unexamined portion of said gap;
   (f) control means responsive to said crab angle signal and operable to rotate said transducer means to a position so that said entire gap including said unexamined portion is covered by said angle look sonar receiver beam.

2. Apparatus according to claim 1 wherein:
   (a) said angle look sonar means includes first and second transducer means and is operable to form two receiver beams at an angle to one another, the intersection of said beams with said target area forming a narrow V- shaped strip bridging said gap.

3. Apparatus according to claim 2 wherein:
   (a) said control means includes a low pass filter to smooth any abrupt changes in said crab angle signal.

4. Apparatus according to claim 2 wherein:
   (a) said control means includes a motor for rotating said first and second transducer means, and servomechanism means for energizing said motor until the heading of said first and second transducer means is aligned with said track of said vehicle.

5. Apparatus according to claim 4 which includes:
   (a) means for disabling said motor to prevent rotation of said first and second transducer means during an expected acoustic return after an acoustic projection.

6. Apparatus according to claim 2 wherein:
   (a) said means for generating a crab angle signal includes (i) a compass means operable to provide a compass signal indicative of the heading of said vehicle, (ii) navigation means operable to provide a navigation signal indicative of the actual line of travel of said vehicle, and (iii) means for subtracting said compass and navigation signals to derive said crab angle signal.

7. Apparatus according to claim 2 which includes:
   (a) first and second elongated transducer housings respectively housing said first and second transducer means;
   (b) one end of each said housing being rotatable about a pivot;
   (c) a brace connecting said first and second housings;
   (d) a retractable plunger mechanism having a plunger arm connected to said brace for deploying said transducer housings to a predetermined orientation for use and for retracting them to a rest position when not in use.

8. Apparatus according to claim 1 wherein:
   (a) said side look sonar means and said angle look sonar means are each operable to generate receiver signals indicative of acoustic returns from said target area; and which includes,
   (b) display means for displaying said receiver signals to provide an acoustic portrayal of said target area during the course of travel of said vehicle.

* * * * *